United States Patent [19]
Hwang

[11] Patent Number: 5,739,749
[45] Date of Patent: Apr. 14, 1998

[54] FORCED PASSIVE ANTI-HIJACK SECURITY SYSTEM

[76] Inventor: Shih Ming Hwang, 17811 Sky Park Cir., Suite D&E, Irvine, Calif. 92714

[21] Appl. No.: 717,861

[22] Filed: Sep. 23, 1996

[51] Int. Cl.⁶ .................................................. B60B 25/10
[52] U.S. Cl. .................... 340/426; 340/425.5; 340/428; 340/430; 307/10.2; 180/287
[58] Field of Search .................... 340/426, 430, 340/425.5, 428; 307/10.2, 10.3, 10.4, 10.6; 180/287

[56] References Cited

U.S. PATENT DOCUMENTS

| | | | |
|---|---|---|---|
| 5,315,286 | 5/1994 | Nolan | 340/426 |
| 5,357,560 | 10/1994 | Nykerk | 340/426 |
| 5,394,135 | 2/1995 | Stadler | 340/428 |
| 5,477,206 | 12/1995 | Bodriguez, Sr. | 340/430 |
| 5,534,845 | 7/1996 | Issa et al. | 340/425.5 |
| 5,539,377 | 7/1996 | Dillon | 340/430 |
| 5,559,491 | 9/1996 | Stadler | 340/426 |

*Primary Examiner*—Jeffery Hofsass
*Assistant Examiner*—Davetta Woods
*Attorney, Agent, or Firm*—David & Raymond; Raymond Y. Chan

[57] ABSTRACT

An anti-hijack security system which automatically protects the vehicle with anti-hijack after the ignition has been turned off for a predetermined long period of time or after the ignition has been turned off and a door has been opened and closed for a predetermined short period of time. Thus, ensuring the owner to have anti-hijack protection when he returns to his vehicle. The anti-hijack protection system also makes sure that, once triggered, it will perform the anti-hijack trigger sequence even if a door sensing device is damaged or if a door is not closed properly. The system also makes sure that once anti-hijack trigger sequence is in it's last few stages, it cannot be disarmed by simply pressing the arm/disarm switch but can only be disarmed by entering a security code.

3 Claims, 6 Drawing Sheets

FORCED PASSIVE ANTI-HIJACK SECURITY SYSTEM

BACKGROUND OF THE INVENTION

1. Field of the Invention

The present invention relates in general to anti-hijack security systems and more particularly to an anti-hijack security system which automatically arms itself after the ignition has been turned off for a predetermined long period of time or after the ignition has been turned off and a door has been opened and closed for a predetermined short period of time. Thus, the owner is ensured to have anti-hijack protection when owner returns to his vehicle.

The present invention also relates in general to anti-hijack security systems and more particularly to an anti-hijack security system for ensuring personal safety as well as making sure of triggering the anti-hijack system and performing the anti-hijack trigger sequence (chirping siren, flashing parking lights, etc..).

The present invention also relates in general to anti-hijack security systems and more particularly to an anti-hijack security system, in which when triggered and it is in last few stages of trigger sequence, cannot be disarmed by simply pressing the arm/disarm button but can only be disarmed by entering a security code.

2. Description of the Prior Art

Most anti-hijack security systems need to be activated by pressing the arm/disarm button before entering or leaving the vehicle. However, most owners forget to press the arm/disarm button so as to arm the vehicle with anti-hijack. Thus, there is a high possibility of hijacking the vehicles permanently.

Although some systems like those disclosed in U.S. Pat. No. 5,172,094 of David M. Stadler and U.S. Pat. No. 5,463,372 of Ralph A. Mawyer, Sr. always provide anti-hijack protection during driving or upon returning to the vehicle, they have the disadvantage of accidentally triggering the anti-hijack system when an authorized driver turns on the ignition to start the engine as result of accidental shutting off the engine.

U.S. Pat. No. 4,107,543 of Neil B. Kaplan shows an arming method of an anti-theft security system which automatically arms itself as the authorized user leaves the vehicle and closes the last opened door. This has the disadvantage of unable to automatically arm itself if a door sensing device like pin switch is damaged or defective.

Furthermore, some hijackers armed with guns and/or knives are not satisfied without stealing the owner's personal belongings. Usually, taking off those personal belongings takes around 5 to 25 minutes. In this case, it is best for the owner to surrender his vehicle and personal belongings quietly to avoid physical harm.

The problem lies in that most anti-hijack security systems start chirping the siren and/or flashing the parking lights after ignition has been turned on and a door has been opened for a pre-determined short period of time (usually 2 minutes after a door has been opened). This puts the owner into a high risk of getting physical harm.

To solve this problem, many anti-hijack security systems will trigger only and start chirping the siren and/or flashing the parking lights after the ignition has been turned on and a door has been opened and closed for a pre-determined short period of time. However, this type of anti-hijack security system has the disadvantage of not triggering the anti-hijack if a door has not been closed properly or if a door sensing device has been damaged prior to or during the hijacking.

Furthermore, most anti-hijack security systems can be easily disarmed by just pressing or flicking the hidden disarm switch after turning ON the ignition. To prevent hijackers from disarming the anti-hijack, installers hide the disarm switch. However, hiding the disarm switch will not hinder the thieves from stealing the vehicle. Hiding the disarm switch under the dash or in the compartment will not provide effective security for thieves know that they'll find it within reach of the driver's seat, or under the dashboard.

SUMMARY OF THE INVENTION

The object of this invention is to provide an anti-hijack security system which automatically protects the vehicle with anti-hijack function when owner leaves the vehicle.

Another object of this invention is to ensure personal safety as well as the triggering of the anti-hijack system and execution of the anti-hijack trigger sequence.

It is also another object of this invention to prevent easy disarming of anti-hijack once it is in the last few stages of anti-hijack trigger sequence.

Unlike other anti-hijack security systems which may fail to automatically protect the vehicle with anti-hijack function because of damaged door sensing device, the present invention won't fail to automatically arm itself even if the door sensing device has been damaged.

The present invention employs a first and a second programmable timer in arming itself. The first timer starts as soon as the ignition is turned off while the second timer starts as soon as the ignition is turned off and a door is opened and closed. The first timer stops and resets only when ignition is turned on while the second timer stops when a door is opened and continues to count when door is closed back. The second timer also stops and resets when ignition is turned on. Whichever of the first and second timers finish counting first, it will automatically arm the system. So, even if a door is not closed back properly or if a door sensing device is damaged, the system will still arm itself.

Unlike other anti-hijack security system which may put you in danger or may not trigger the anti-hijack and may not execute the anti-hijack trigger sequence, the present invention ensures personal safety as well as the triggering of the anti-hijack and execution of the anti-hijack trigger sequence.

The present invention also employs a first and second armed programmable timers during armed condition. The first armed timer can only start counting after the ignition is turned on and a door has been opened and closed. If ignition is turned off during the countdown of the first armed timer, the first armed timer will be put in standby and will only continue counting if ignition is turned back on. The first armed timer will stop and reset if a door is opened and restart counting if door is closed back. This ensures the owner's personal safety.

The second armed timer can start counting after the ignition is turned on and a door has been opened. If ignition is turned off during the countdown of the second armed timer, the second armed timer will be put in standby and will only continue counting if ignition is turned back on. This ensures the execution of the anti-hijack trigger sequence even if door is not closed properly or if the door sensing device is damaged.

Whichever of the first and second armed timers finish counting first, it will immediately start executing the anti-hijack trigger sequence i.e. flashing the LED, chirping the siren, flashing the parking lights, etc..

Unlike other anti-hijack security systems which can be easily disarmed by pressing the disarm button, the present invention cannot be easily disarmed once it's in the last few stages of anti-hijack trigger sequence. It can only be disarmed by entering the security code.

It will be apparent to those skilled in the art that various modifications can be made to the anti-hijack security system of the instant invention without departing from the scope or spirit of the invention, and it is intended that the present invention cover modifications and variations of the anti-hijack security system like adding a seat sensor, microwave sensor or shock sensor instead of door sensor, keypad, coded key or remote transmitter instead of the disarm button, etc..

BRIEF DESCRIPTION OF THE DRAWINGS

The above and still further objects, features and advantages of the present invention will become apparent upon consideration of the following description of the invention and accompanying drawings wherein.

DETAILED DESCRIPTION OF THE PREFERRED EMBODIMENT

Figure 1A:
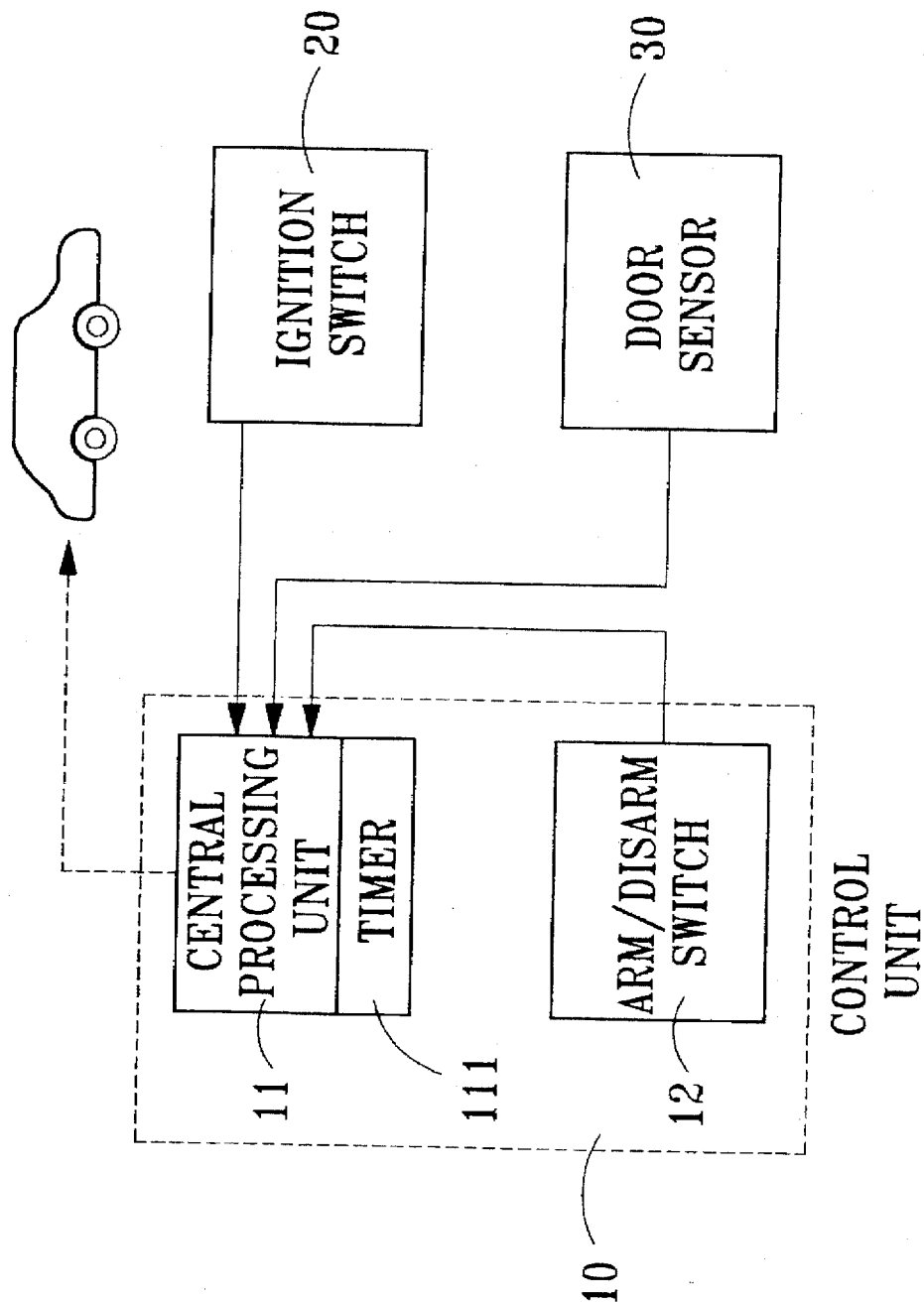
FIG. 1a is a block diagram showing the invented anti-hijack security apparatus.
Figure 1B:
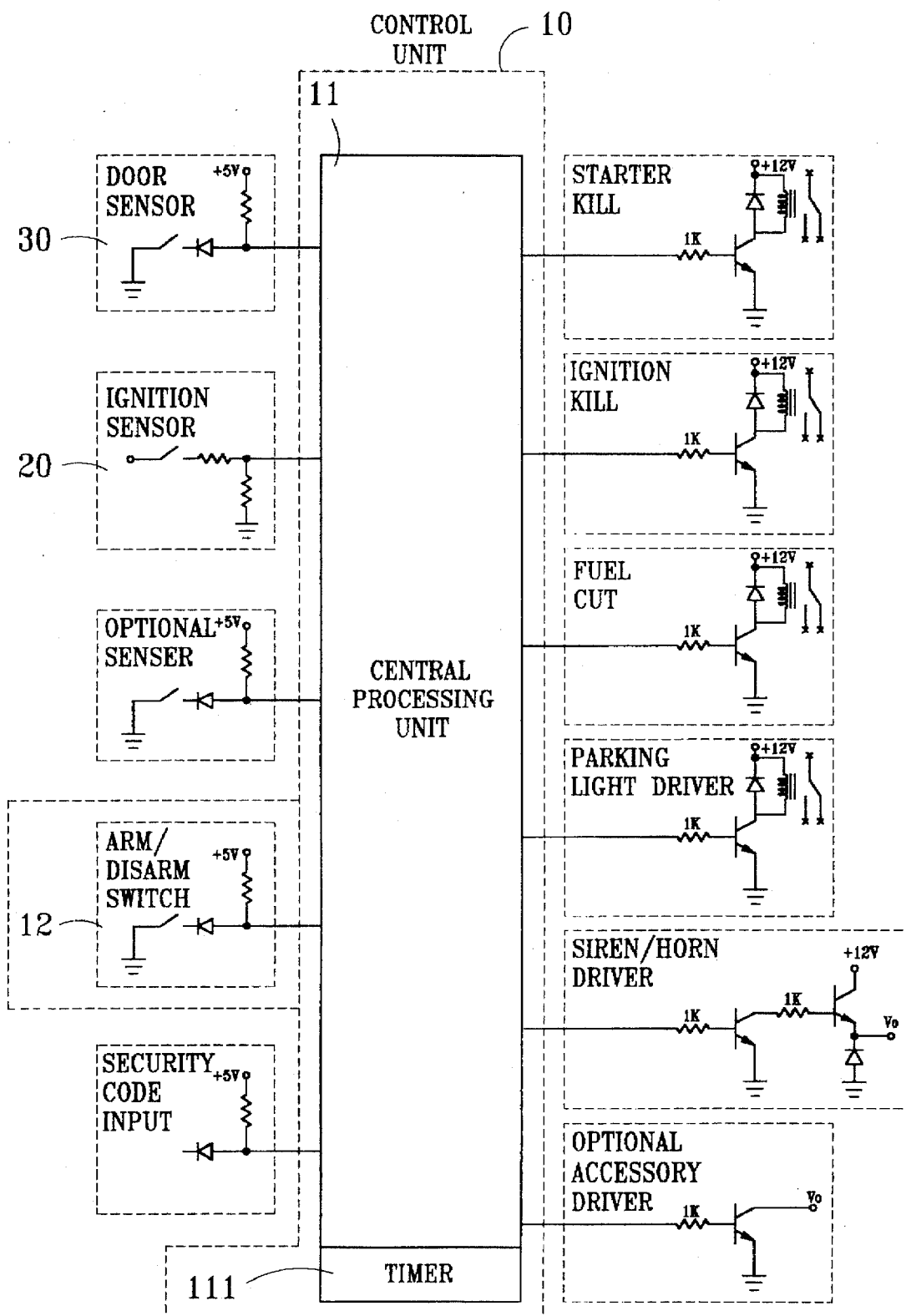
FIG. 1b is a circuit diagram showing the invented anti-hijack security apparatus.

As shown in block diagram (FIG. 1a) and circuit diagram (FIG. 1b) of our invented anti-hijack security system, it comprises a control unit (10), an ignition switch (20), and a plurality of door sensors (30).

The control unit (10) comprises a Central Processing Unit (11) and an arm/disarm switch (12).

The Central Processing Unit (11) which has a plurality of built-in timers (111) is the main brain of the anti-hijack security system. It is responsible for enabling and disabling the starter kill, ignition kill, and fuel cut. It is also responsible for sounding the siren and flashing the parking lights.

The arm/disarm switch (12) is used to manually arm anti-hijack or reset the triggered anti-hijack system, i.e. stop siren/horn and parking light outputs. However, the arm/disarm (12) switch cannot reset the anti-hijack if it is in last few stages of the anti-hijack triggered sequence.

The ignition switch (20) is used to detect if the engine is on. It is also used together with the arm/disarm (12) switch so as to arm or disarm the anti-hijack security system and to reset the anti-hijack trigger sequence.

The door sensor (30) and optional sensor which can be a seat sensor, microwave sensor, ultrasonic sensor or other known type of sensor are used to sense intrusion to the vehicle.

The timers (111) include a first and a second programmable timer TIMER4, TIMER5, wherein the first timer TIMER4 stars to count as soon as the ignition switch (20) is turned off while the second timer TIMER5 starts to count as soon as the ignition switch (20) is turned off and the door sensor (30) is opened and then closed. The first timer TIMER4 stops and resets only when the ignition switch (20) is turned on while the second timer TIMER5 stops when one of the doors of the vehicle is opened and continues to count when that door is closed back. The second timer TIMER5 also stops and resets when the ignition switch (20) is turned on. Whichever of the first and second timers TIMER4, TIMER5 finish counting first, it will automatically arm the anti-hijack security system. So, even if the doors of the vehicle are not closed back properly or if any door sensor is damaged, the anti-hijack security system will still arm itself to an armed mode.

The anti-hijack security system further employs a first and a second armed programmable timer TIMER1, TIMER2. During the armed mode, The first armed timer TIMER1 can only start counting after the ignition switch (20) is turned on and one of the doors has been opened and closed. If the ignition switch (20) is turned off during the countdown of the first armed timer, the first armed timer TIMER1 will be put in standby and will only continue counting if the ignition switch (20) is turned back on. The first armed timer TIMER1 will stop and reset if the door is opened and restart counting if the door is closed back. This ensures the owner's personal safety.

The second armed timer TIMER2 can start counting after the ignition switch (20) is turned on and anyone of the doors has been opened. If the ignition switch (20) is turned off during the countdown of the second armed timer TIMER2, the second armed timer TIMER2 will be put in standby and will only continue counting if the ignition switch (20) is turned back on. This ensures the execution of the anti-hijack trigger sequence even if the doors are not closed properly or if the door sensors are damaged.

Whichever of the first and second armed timers TIMER1, TIMER2 finish counting first, it will immediately start executing the anti-hijack triggered sequence, i.e. flashing the LED, chirping the siren, flashing the parking lights, etc..

The present invention will become more apparent upon consideration of the flow chart and its description below.

Figure 2A:
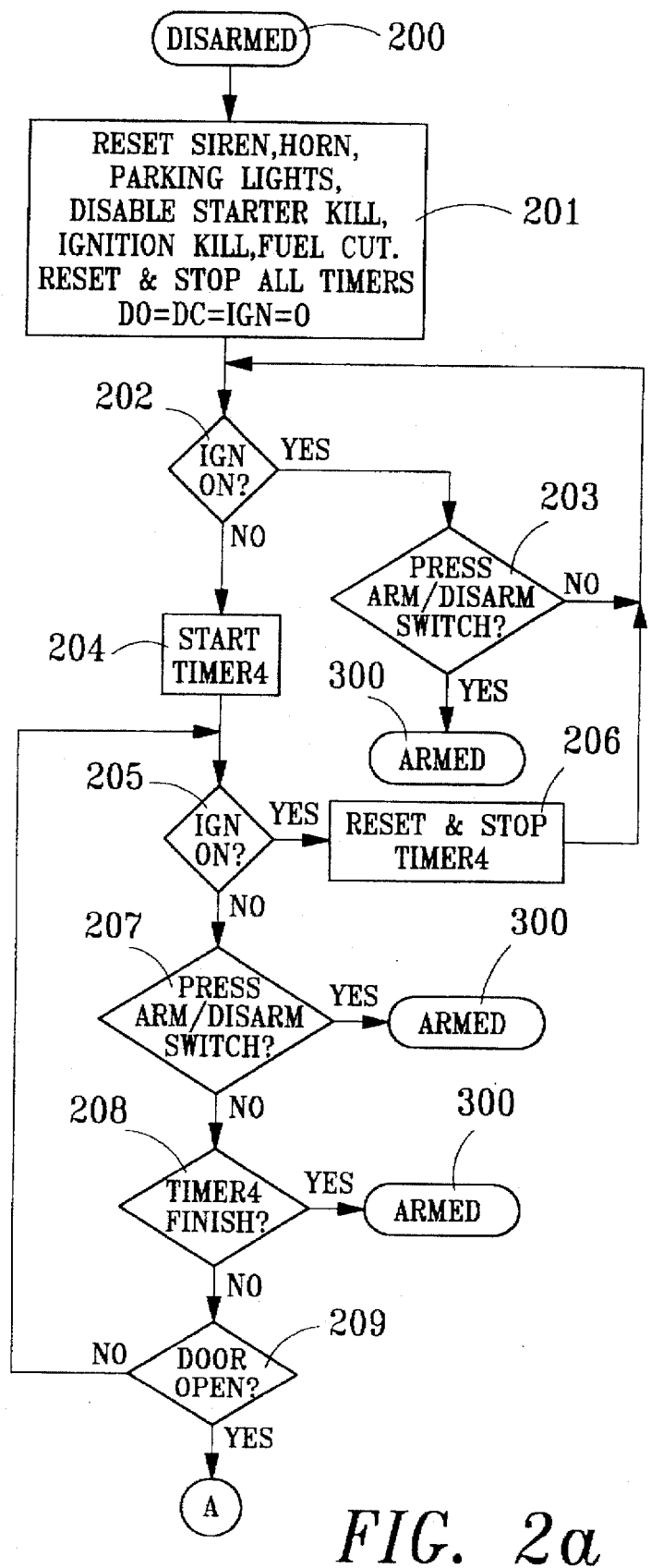
FIGS. 2a, 2b is a flow diagram illustrating the operation of the anti-hijack security system during disarmed condition.
Figure 2B:
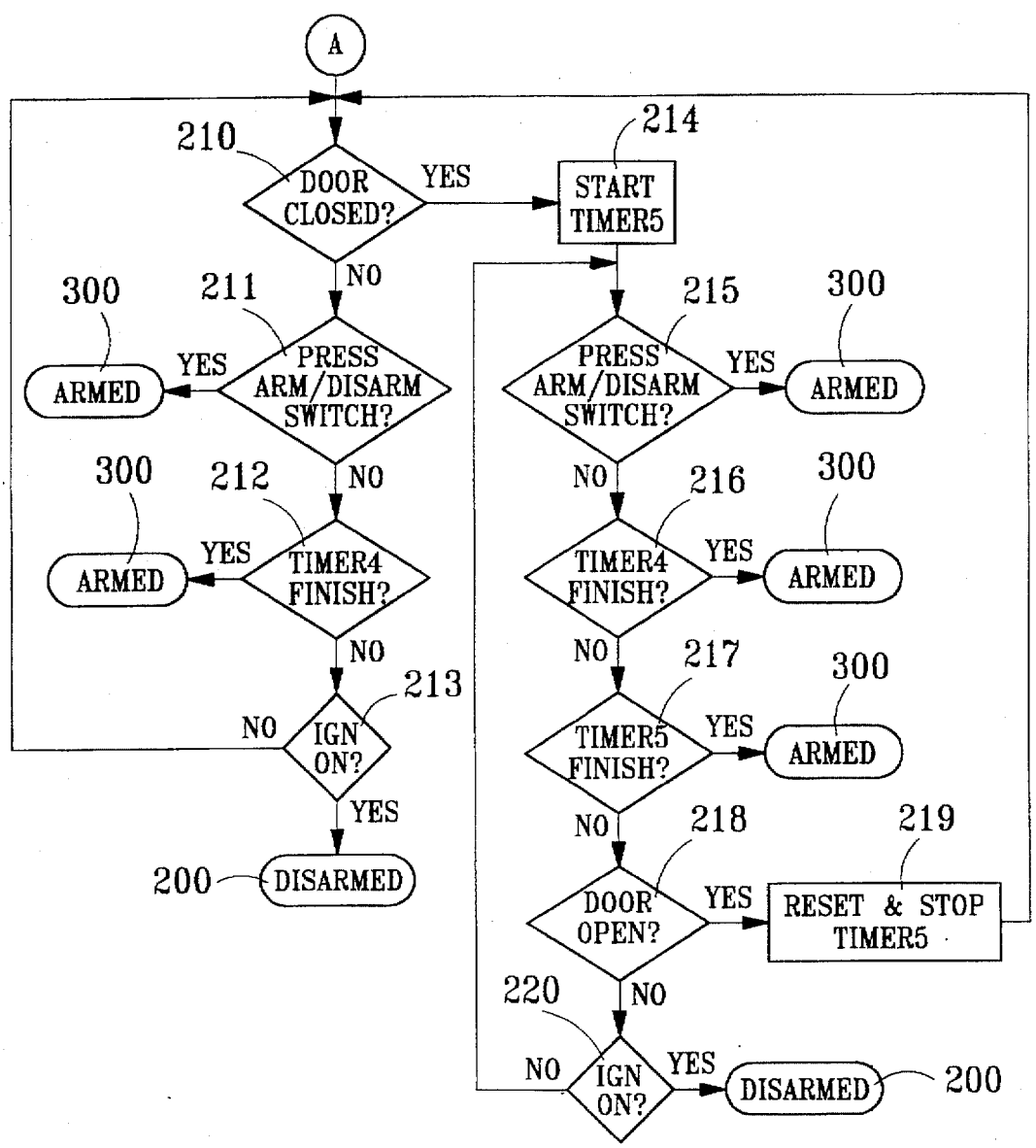

Referring to FIG. 2a, 2b, the anti-hijack security system is in disarmed mode (200). At disarmed mode, step 201 resets the siren, horn and parking lights, disables starter kill, ignition kill and fuel cut, and reset all timers and flags. It then checks the ignition (step 202). If ignition is turned OFF, operation proceeds to step 204. Otherwise, it checks the arm/disarm switch (step 203). If the arm/disarm switch is pressed, the system is put in armed mode (300), otherwise the operation goes back to step 202. At step 204, the first timer TIMER4 starts counting. Then, ignition is checked again (step 205). If ignition is turned ON, the first timer TIMER4 stops and resets (step 206) and operation goes back to step 202. Otherwise, the system checks the arm/disarm switch (step 207) and the first timer TIMER4 (step 208). If either the arm/disarm switch (12) is pressed or the first timer TIMER4 has finished counting, system is put in armed mode (300), If the arm/disarm switch (12) is not pressed or the first timer TIMER4 has not yet finished counting the doors are checked (step 209). If all doors are closed, operation goes back to step 205 or else the doors are checked again (step 210). If all doors are closed, operation proceeds to step 214. Otherwise, the system checks the arm/disarm switch (step 211) and the first timer TIMER4 (step 212). If either the arm/disarm switch is pressed or the first timer TIMER4 has finished counting, then system is put in armed mode (300) or else ignition is checked (step 213). If ignition is turned ON, operation goes back to step 200 or else operation goes back to step 210. At step 214, the second timer TIMER5 starts counting. Then, the system checks the arm/disarm switch (step 215), the first timer TIMER4 (step 216) and the second timer TIMER5 (step 215). If either the arm/disarm siwtch is pressed or the first or second timer TIMER4 or TIMER5 has finished counting, then system is put in armed mode (300). Otherwise, it checks the doors (step 218). If a door is opened, the second timer TIMER5 stops and resets (step 219) and operation goes back to step 210. Otherwise, ignition is checked (step 220). If ignition is turned ON, the system is put in disarmed mode (200) or else operation goes back to step 215.

Figure 3A:
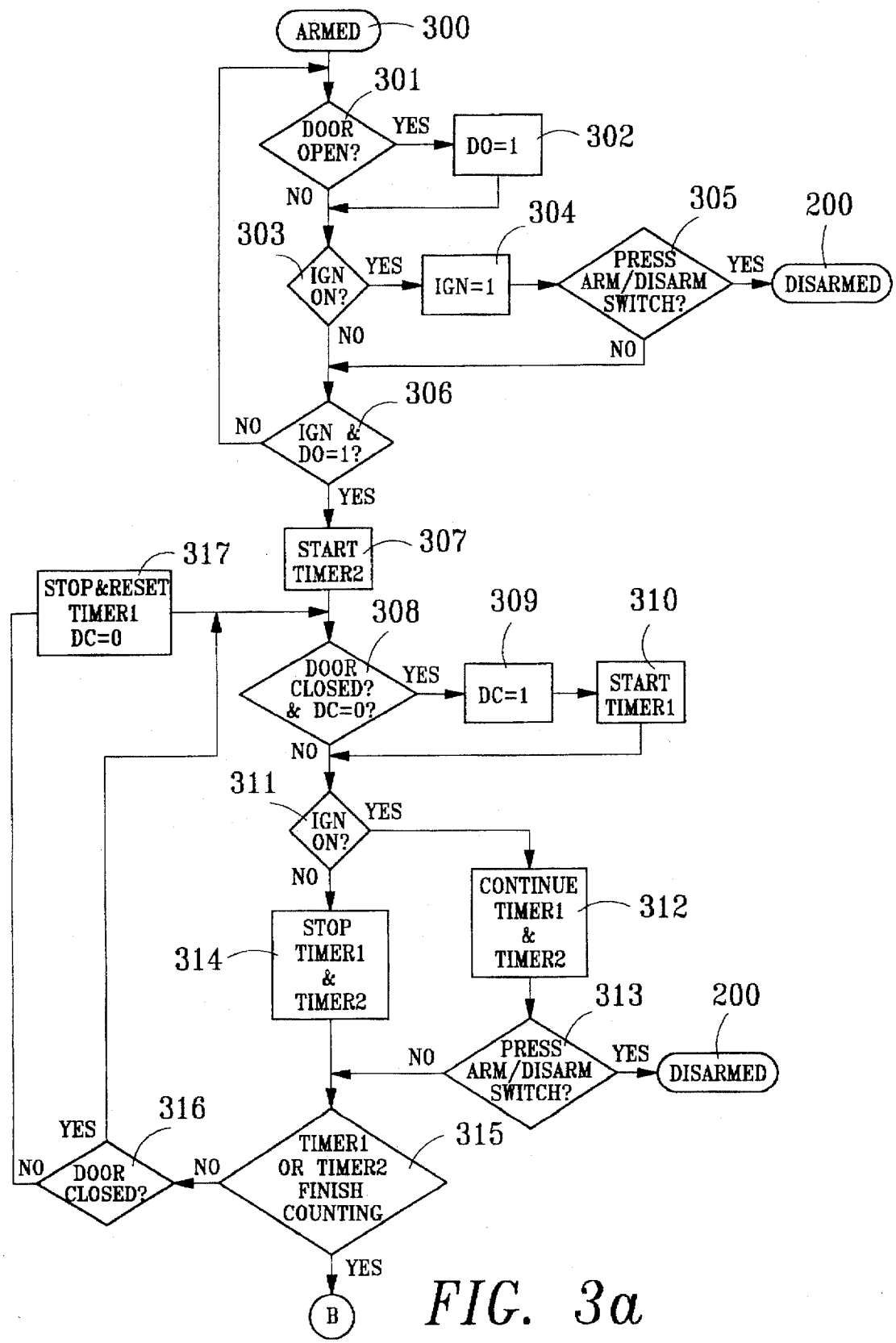
FIGS. 3a, 3b is a flow diagram illustrating the operation of the anti-hijack security system during armed condition.
Figure 3B:
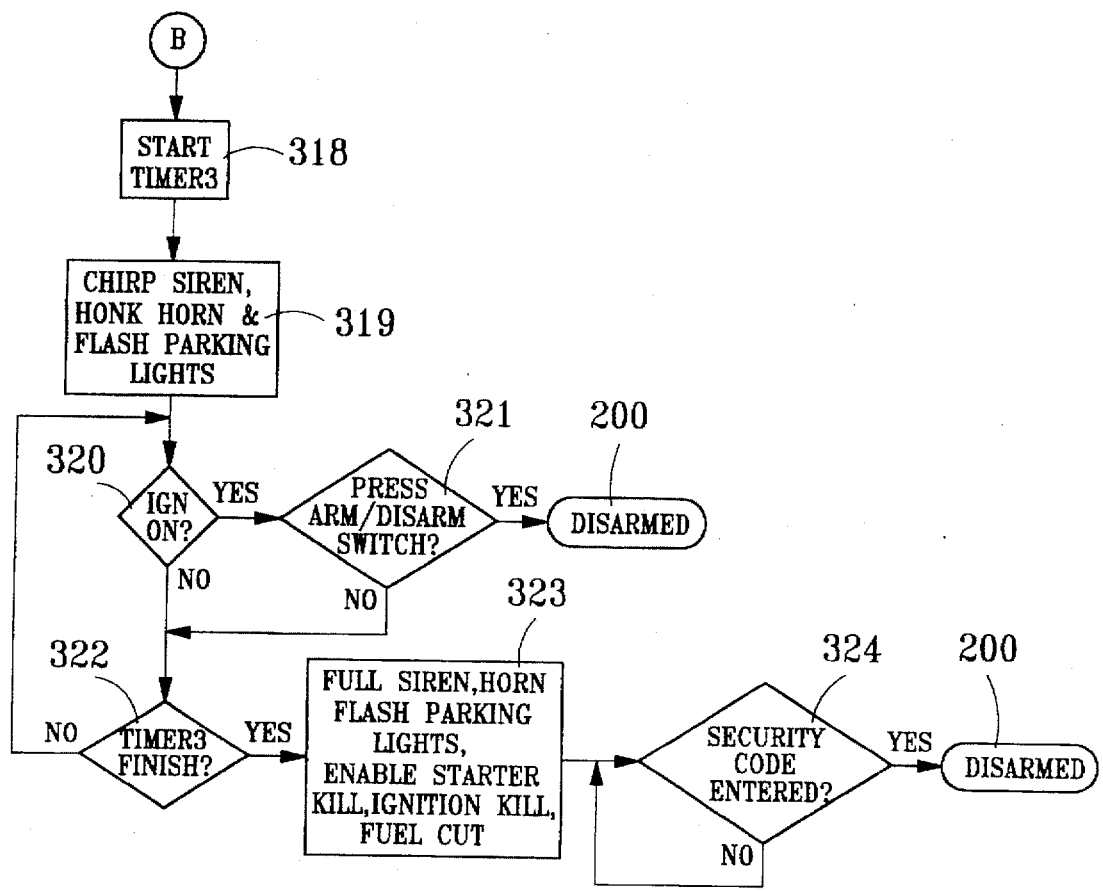

Referring now to FIGS. 3a, 3b, the anti-hijack security system is in the armed mode (300). At the armed mode 300, the doors are checked (step 301). If any door is opened, flag DO is set (step 302). Otherwise, it proceeds directly to check the ignition (step 303). If ignition is turned ON, flag IGN is set (step 304) and check the arm/disarm switch (step 305). If the arm/disarm switch is pressed, the system is put in disarmed mode (200) or else operation proceeds to step 306. If ignition is turned OFF, the operation proceeds directly to check the flags DO and IGN (step 306). If both flags are set, the operation proceeds to step 307 or else the operation goes back to step 301. At step 307, the second armed timer TIMER2 begins counting. Then, doors and flag DC are checked (step 308). If all doors are closed and DC is reset (DC=0), flag DC is set (step 309) and the first armed timer TIMER1 begins counting (step 310). Otherwise, ignition is checked (step 311). If ignition is turned ON, the first and second armed timers TIMER1 and TIMER2 continues counting (step 312) and checks the arm/disarm switch (step 313). If the arm/disarm switch is pressed, the system is put in disarmed mode (200) or else operation proceeds to step 315. If ignition is turned off, the first and second armed timers TIMER1 and TIMER2 stops counting (step 314) and operation proceeds to step 315. At step 315, the first and second armed timers TIMER1 and TIMER2 are checked if either one of them has finished counting. If at least one of the timers has finished counting, the operation proceeds to step 318. Otherwise, doors are again checked (step 316). If all doors are closed, the operation goes back to step 308 or else operation proceeds to step 317 where the first armed TIMER1 stops and resets, and that the DC also resets and operation goes back to step 308. At step 318, a third timer TIMER3 begins counting. Then, siren begins chirping while the parking lights begin flashing (step 319). Then, ignition is checked (step 320). If ignition is turned ON, it checks the arm/disarm switch (step 321). If the disarm switch is pressed, the system is put in disarmed mode (200) or else operation proceeds to step 322. Otherwise, the third timer TIMER3 is checked (step 322). If it has not yet finished counting, operation goes back to step 320. If the third timer TIMER3 has finished counting, the output of both siren and horn change to continuous blast, flashes the parking lights, and to enable starter kill, ignition kill and fuel cut (step 323). At this time, pressing the disarm button cannot reset the anti-hijack security system. At step 324, it checks if security code is entered. If security code is not yet entered, the operation loops security code is entered. It is apparent to the skilled in the art that an additional timer can be added to stop the siren and parking lights so as to prevent draining the car battery totally. If security code is entered, the system is put in disarmed mode (200).

What is claimed is:

1. An anti-hijack security system, comprising:
    an ignition switch adapted for detecting whether an ignition of an engine of a vehicle is turned on or turned off;
    a door sensing means comprising a plurality of door sensors adapted for detecting whether doors of said vehicle are opened or closed; and
    a control unit which comprises a central processing unit which is connected to said ignition switch and said door sensors, said central processing unit having built-in a first and a second timer, said first timer starting to count as soon as said ignition switch is turned off, and said second timer starting to count as soon as said ignition switch is turned off and said door sensing means detects one of the doors of said vehicle is opened and then closed, and that said first timer stops and resets only when said ignition switch is turned on, and that while said second timer stops and resets when one of said doors of said vehicle is detected by said door sensing means to be opened and restarts to count when said door is closed back, and that said second timer also stops and resets when said ignition switch is turned on, in which whichever of said first and second timers finish counting first, said anti-hijack security system is automatically armed from a disarmed mode to an armed mode, said central processing unit further comprising an arm/disarm switch for selectively and manually setting said anti-hijack security system between said armed mode and said disarmed mode; and that
    said anti-hijack security system further employing a first and a second armed timer, during said armed mode, said first armed timer being only started counting after said ignition switch is turned on and one of said doors has been detected by said door sensing means to be opened and closed, moreover when said the ignition switch is turned off during a countdown of said first armed timer, said first armed timer is put in standby and would only continue counting when said ignition switch is turned back on, said first armed timer being stopped and reset when said door is detected to be opened and being restarted counting when said door is detected to be closed back, and that
    said second armed timer starts counting after said ignition switch is turned on and one of said doors has been detected by said door sensing means to be opened, wherein when said ignition switch is turned off during a countdown of said second armed timer, said second armed timer is put in standby and would only continue counting when said ignition switch is turned back on, therefore whichever of said first and second armed timers finish counting first, said central processing unit enables an anti-hijack triggered sequence for sounding a siren and flashing parking lights of said vehicle, and that either manually setting said arm/disarm switch to said disarmed mode or keying in a security code into said central processing unit, said anti-hijack triggered sequence is disabled and said anti-hijack security system is put in said disarmed mode.

2. An anti-hijack security system, as recited in claim 1, wherein said first timer is programmed for a longer counting time than said second timer which is programmed to count for a shorter time, so that even said door is left opened or not properly closed or said door sensing means is damaged, said first timer with longer counting time still would finally set said anti-hijack security system to said armed mode, whereby when said door is opened during said countdown stops and resets said second timer, said first timer still continues counting and said second timer starts to countdown once said door is closed again, furthermore when said ignition switch is turned on during said countdown of said first and second timers and said door is not opened, said first and second timers stops and resets again, thereby when said ignition switch is turned on followed by opening of said door during said armed mode, said second armed timer is initiated to countdown, said first armed timer starts counting after said ignition switch is turned on followed by opening and closing of said door during said armed mode, and that when said ignition switch is turned off again, both said first and second armed timers temporarily stops said countdown.

3. An anti-hijack security system, as recited in claim 2, wherein when one of said first and second armed timers finish counting, said central processing unit further enables said anti-hijack triggered sequence for cutting a fuel system, an ignition system and a starter solenoid of said vehicle.

* * * * *